US010486685B2

(12) United States Patent
Suzuki et al.

(10) Patent No.: US 10,486,685 B2
(45) Date of Patent: Nov. 26, 2019

(54) DRIVING CONTROL MECHANISM AND DRIVING CONTROL DEVICE

(71) Applicant: FUJI JUKOGYO KABUSHIKI KAISHA, Tokyo (JP)

(72) Inventors: Hiroyuki Suzuki, Tokyo (JP); Wataru Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 336 days.

(21) Appl. No.: 15/448,807

(22) Filed: Mar. 3, 2017

(65) Prior Publication Data
US 2017/0282900 A1 Oct. 5, 2017

(30) Foreign Application Priority Data

Mar. 29, 2016 (JP) ................................. 2016-066473

(51) Int. Cl.
*B60W 20/40* (2016.01)
*B60W 20/15* (2016.01)
(Continued)

(52) U.S. Cl.
CPC .............. *B60W 20/15* (2016.01); *B60K 6/48* (2013.01); *B60W 10/06* (2013.01); *B60W 10/08* (2013.01);
(Continued)

(58) Field of Classification Search
CPC .......................... B60W 20/40; B60W 10/107
See application file for complete search history.

(56) References Cited

U.S. PATENT DOCUMENTS 7,347,803 B2 * 3/2008 Kobayashi ............... B60K 6/48
477/5
8,775,043 B2 * 7/2014 Imaseki ................... B60K 6/36
701/67
(Continued)

FOREIGN PATENT DOCUMENTS

CN 103112347 A 5/2013
CN 104736406 A 6/2015
(Continued)

OTHER PUBLICATIONS

Office Action for CN Patent Application No. 201710107269, dated Oct. 17, 2018, 08 pages of Office Action.
(Continued)

*Primary Examiner* — Sherry L Estremsky
(74) *Attorney, Agent, or Firm* — Chip Law Group

(57) ABSTRACT

A driving control mechanism includes: a motor that is coupled to a driving wheel; a transmission that is coupled to the driving wheel; and an internal combustion engine that is coupled to an input shaft of the transmission. In a first state in which a driving force of the motor is transmitted to the driving wheel and a driving force of the internal combustion engine is not transmitted to the driving wheel, the transmission reduces a transmission gear ratio to a value less than a target transmission gear ratio according to a requested driving force when a transition request to a second state in which driving forces of the motor and the internal combustion engine are transmitted to the driving wheel is issued. The motor increases a driving force to be transmitted to the driving wheel when the transition request is issued.

13 Claims, 5 Drawing Sheets

(51) Int. Cl.
*B60K 6/48* (2007.10)
*B60W 10/08* (2006.01)
*B60W 10/107* (2012.01)
*B60W 30/20* (2006.01)
*B60W 10/06* (2006.01)
*B60W 20/30* (2016.01)

(52) U.S. Cl.
CPC .......... *B60W 10/107* (2013.01); *B60W 20/30* (2013.01); *B60W 20/40* (2013.01); *B60W 30/20* (2013.01); *B60W 2510/083* (2013.01); *B60W 2510/244* (2013.01); *B60W 2710/083* (2013.01); *B60W 2710/1005* (2013.01); *B60Y 2200/92* (2013.01); *Y02T 10/6286* (2013.01); *Y02T 10/7258* (2013.01); *Y10S 903/93* (2013.01); *Y10S 903/945* (2013.01)

(56) References Cited

U.S. PATENT DOCUMENTS

| | | | | |
|---|---|---|---|---|
| 10,106,147 | B2* | 10/2018 | Park | B60W 20/15 |
| 2008/0132378 | A1* | 6/2008 | Bouchon | B60K 6/48 477/3 |
| 2010/0273604 | A1* | 10/2010 | Imaseki | B60K 6/365 477/5 |
| 2015/0283993 | A1 | 10/2015 | Takano et al. | |
| 2016/0368474 | A1* | 12/2016 | Komuro | B60W 10/02 |

FOREIGN PATENT DOCUMENTS

| | | |
|---|---|---|
| CN | 106103225 A | 11/2016 |
| JP | 2010-036847 A | 2/2010 |
| JP | 2015-150916 A | 8/2015 |
| JP | 2015-174484 A | 10/2015 |
| WO | 2011/158853 A1 | 12/2011 |

OTHER PUBLICATIONS

Office Action for JP Patent Application No. 2016-066473, dated Dec. 5, 2017, 06 pages of Office Action and 06 pages of English Translation.

* cited by examiner

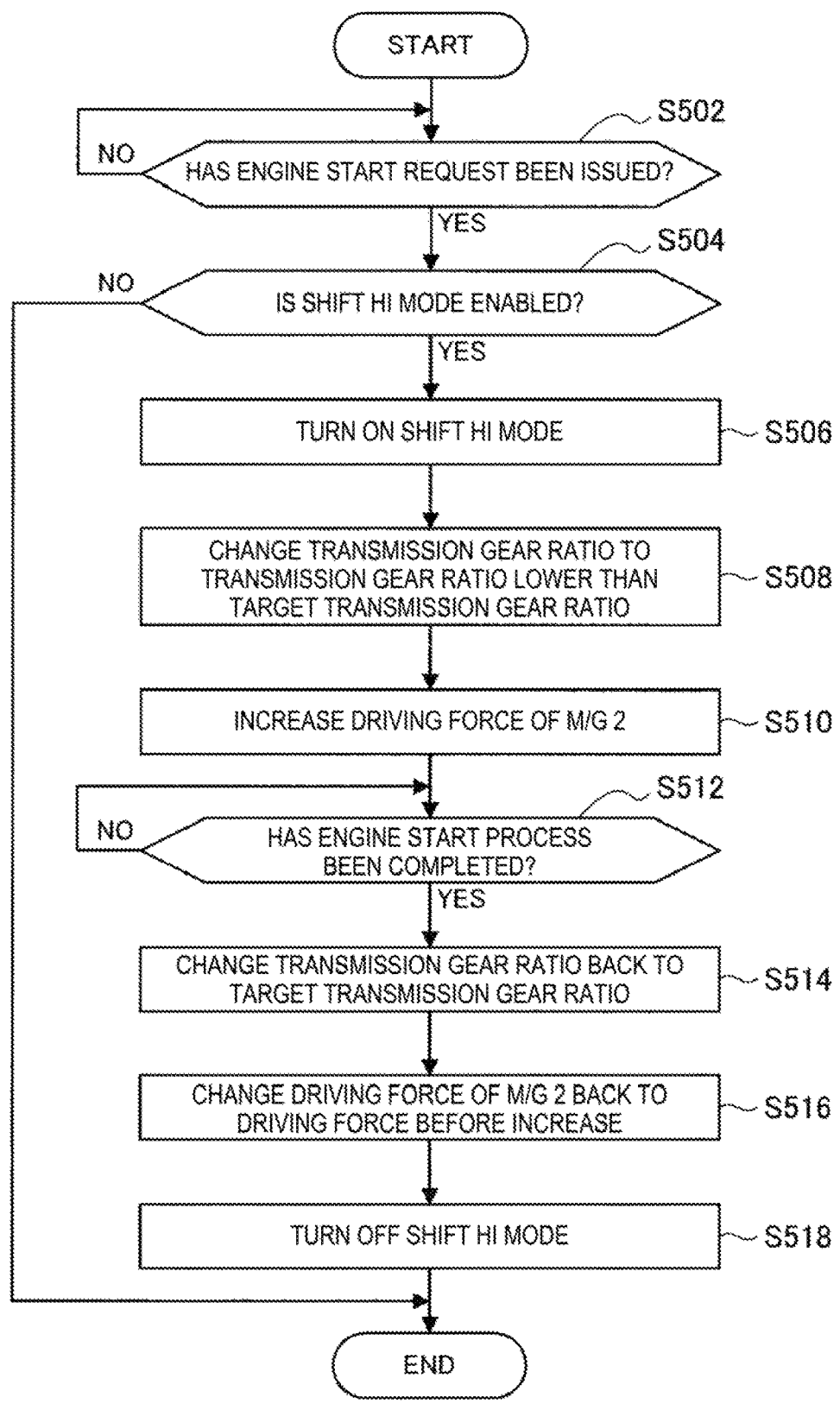

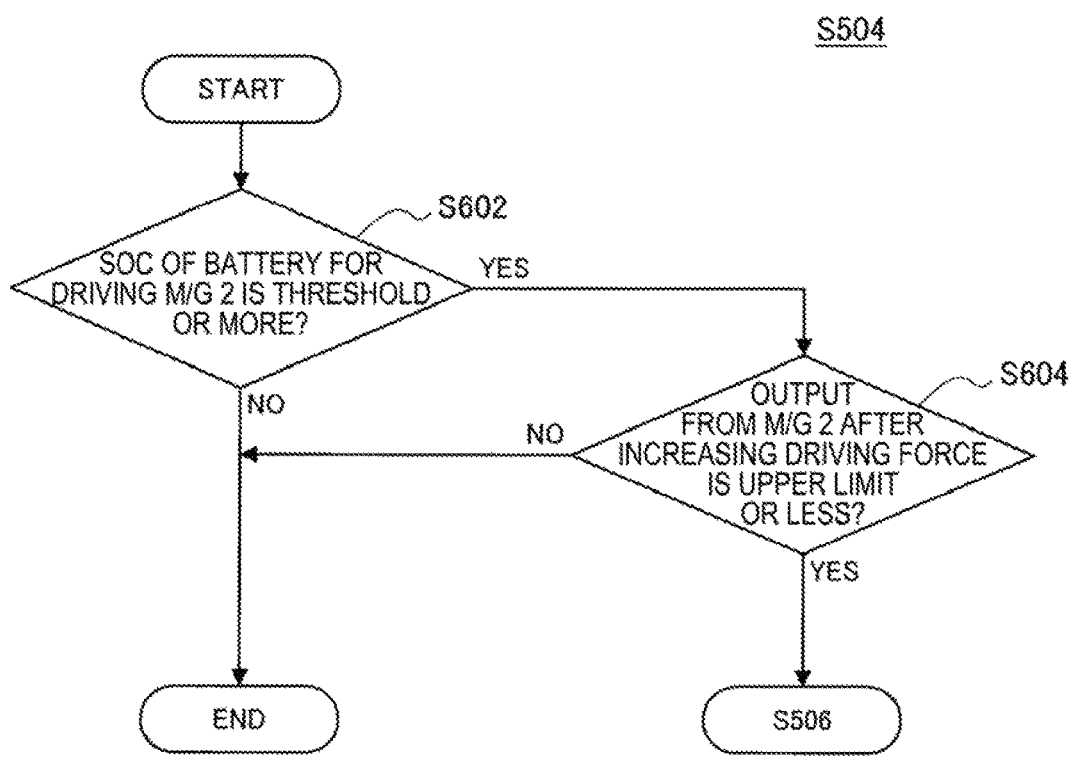

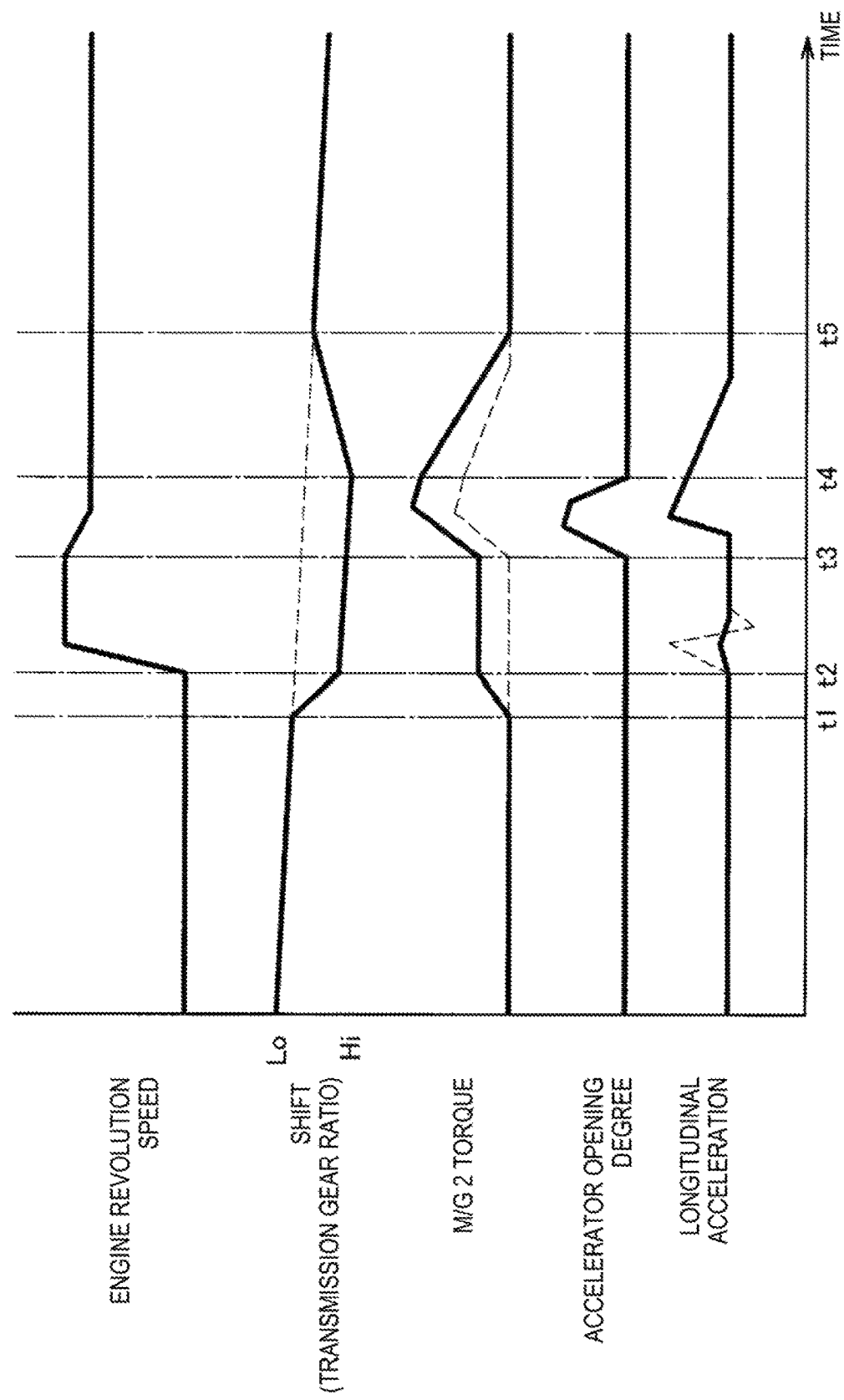

DRIVING CONTROL MECHANISM AND DRIVING CONTROL DEVICE

CROSS-REFERENCE TO RELATED APPLICATIONS

The present application claims priority from Japanese Patent Application No. 2016-066473 filed on Mar. 29, 2016, the entire contents of which are hereby incorporated by reference.

BACKGROUND

1. Technical Field

The present invention relates to driving control mechanisms and driving control devices.

2. Related Art

In recent years, hybrid technologies in vehicle power have been researched and developed. The hybrid technologies include a technology in which an engine and motors are used as power sources. In general, a vehicle using such a hybrid technology travels in an electric vehicle (EV) mode or a hybrid electric vehicle (HEV) mode. In the EV mode, a vehicle is driven by motors. In the HEV mode, a vehicle is driven by motors or an engine.

Sometimes a shock occurs in a vehicle when the mode is switched from the EV mode to the HEV mode. For example, shock occurrence possibility when engaging a driving wheel side and an engine side increases with increase in difference in rotation speed (hereinafter, also referred to as rotation difference) between the driving wheel side and the engine side in which an engine starts when switching to the HEV mode.

On the other hand, Japanese Unexamined Patent Application Publication (JP-A) No. 2015-150916 discloses an invention related to a control device that controls at least one of an engine revolution speed or a transmission gear ratio of a continuously variable transmission in a manner that a rotation speed of a secondary shaft of the continuously variable transmission exceeds a rotation speed of a driving wheel when the EV mode is switched to the HEV mode. In JP-A No. 2015-150916, the engine and the continuously variable transmission are directly coupled, the continuously variable transmission and the driving wheels are coupled via a clutch, and the motors and the driving wheels are directly coupled.

However, the invention disclosed by JP-A No. 2015-150916 has a problem that a driving force transmitted to the driving wheel is reduced due to control on a transmission gear ratio of a transmission. For example, the transmission gear ratio is thought to be reduced so as to make the rotation speed of the secondary shaft larger than the rotation speed of the driving wheel. However, when the transmission gear ratio is reduced, the rotation speed of the secondary shaft increases and the driving force transmitted from the secondary shaft to the driving wheel is reduced.

SUMMARY OF THE INVENTION

Accordingly, it is desirable to provide a system capable of doing both suppression of shocks relating to power transmission and keeping of a driving force when switching the EV mode to the HEV mode.

An aspect of the present invention provides a driving control mechanism including: a motor that is coupled to a driving wheel; a transmission that is coupled to the driving wheel; and an internal combustion engine that is coupled to an input shaft of the transmission. In a first state in which a driving force of the motor is transmitted to the driving wheel and a driving force of the internal combustion engine is not transmitted to the driving wheel, the transmission reduces a transmission gear ratio to a value less than a target transmission gear ratio according to a requested driving force when a transition request to a second state in which driving forces of the motor and the internal combustion engine are transmitted to the driving wheel is issued. The motor increases a driving force to be transmitted to the driving wheel when the transition request is issued.

When the transition request is issued, the transmission may reduce a transmission gear ratio to a value slightly above a transmission gear ratio at which a rotation speed of the input shaft becomes a rotation speed at which the internal combustion engine stops.

When the transition request is issued, the transmission may reduce a transmission gear ratio to a value less than the target transmission gear ratio before a driving force of the internal combustion engine is transmitted to the driving wheel.

The transmission may reduce a transmission gear ratio to a value less than the target transmission gear ratio in a case where the motor increases a driving force.

The motor may increase a driving force in a case where an output of the motor after increasing the driving force is an upper limit or less.

The motor may increase a driving force in a case where a value related to an electric power stored in a battery to be used for driving the motor is a threshold or more.

The motor may increase a driving force by a value more than or equal to a difference between the requested driving force and a driving force after reducing a transmission gear ratio.

The motor may change a driving force in accordance with a change in a transmission gear ratio.

The transmission may change a transmission gear ratio back to the target transmission gear ratio after transitioning to the second state.

The transmission may change a transmission gear ratio back to the target transmission gear ratio more gently than a change for reducing a transmission gear ratio.

Another aspect of the present invention provides a driving control device including: a determination module that determines presence or absence of a transition request to a second state in which driving forces of a motor and an internal combustion engine are transmitted to a driving wheel, in a first state in which a driving force of the motor is transmitted to the driving wheel and a driving force of the internal combustion engine is not transmitted to the driving wheel; and a controller that outputs a command to reduce a transmission gear ratio of a transmission to a value less than a target transmission gear ratio according to a requested driving force, and outputs a command to increase a driving force to be transmitted from the motor to the driving wheel, when the determination module determines that the transmission request has been issued.

BRIEF DESCRIPTION OF THE DRAWINGS

FIG. 3 is a flow chart schematically illustrating an example of an entire process of a hybrid ECU according to an implementation of the present invention;

FIG. 4 is a flow chart schematically illustrating an example of a shift Hi mode enablement determination process of a hybrid ECU according to an implementation of the present invention; and FIG. 5 is a timing chart illustrating an operation example of a driving control mechanism according to an implementation of the present invention.

DETAILED DESCRIPTION

Figure 1:
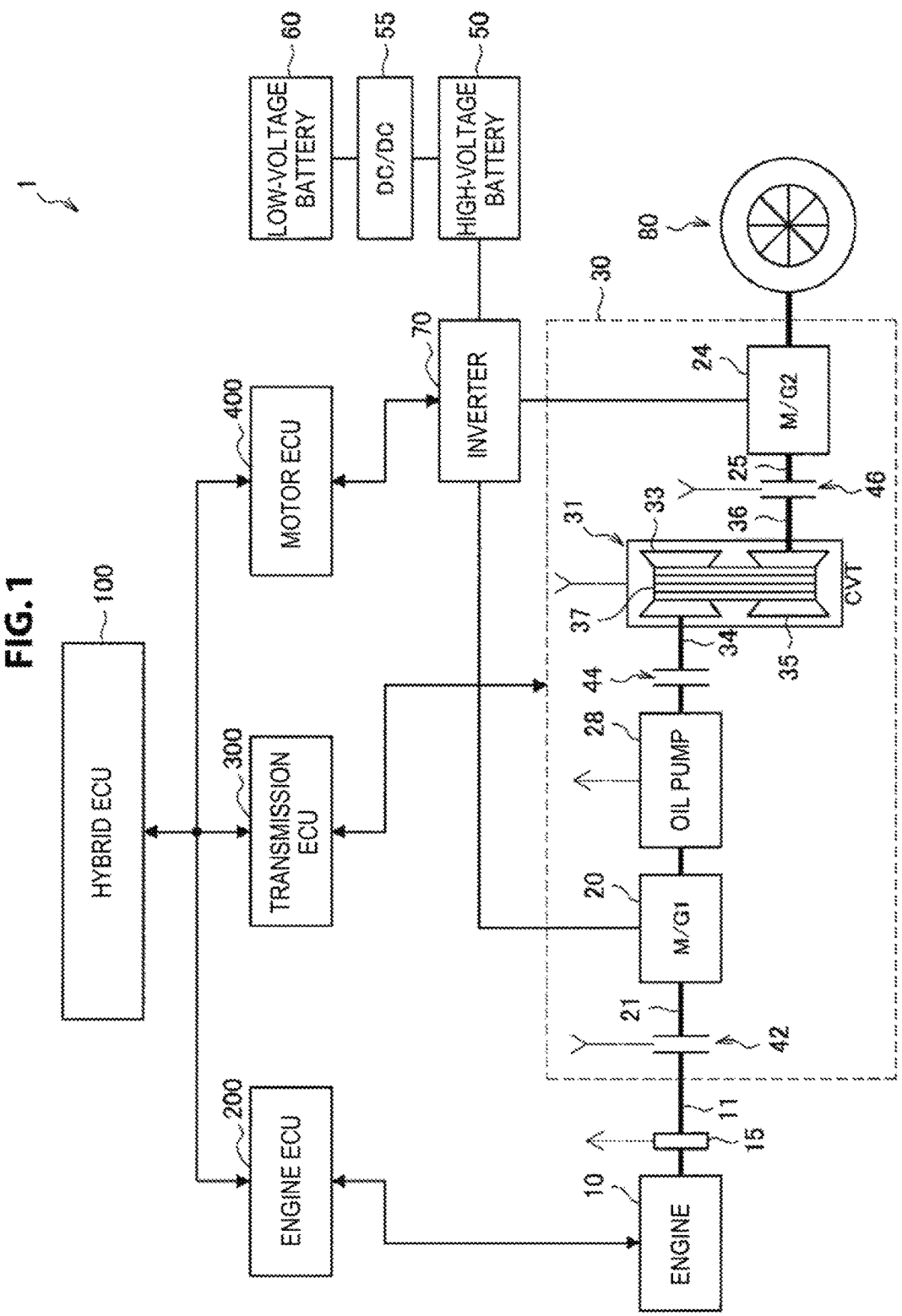
FIG. 1 is a diagram illustrating an example of an entire configuration of a driving control mechanism according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

<1. Implementation of Present Invention>

A driving control mechanism according to an implementation of the present invention will be described.

<1-1. Configuration of Driving Control Mechanism>

With reference to FIG. 1, an entire configuration of a driving control mechanism 1 will be described. FIG. 1 is a diagram illustrating an example of the entire configuration of the driving control mechanism 1 according to an implementation of the present invention.

FIG. 1 illustrates the driving control mechanism 1 of a hybrid vehicle. The driving control mechanism 1 includes an engine 10, a first motor generator 20, and a second motor generator 24, and is a power unit capable of using the engine 10, the first motor generator 20, and the second motor generation 24 in combination as a driving source. In the driving control mechanism 1, a vehicle driving force is controlled while traveling modes are switched among an engine traveling mode, a single motor EV traveling mode, a twin motor EV traveling mode (first state, EV mode), and a hybrid traveling mode (second state, HEV mode).

The engine traveling mode is a mode in which a vehicle is driven by output from the engine 10. The single motor EV traveling mode is a mode in which a vehicle is driven by output from the second motor generator 24. The twin motor EV traveling mode is a mode in which a vehicle is driven by output from the first motor generator 20 and the second motor generator 24. The hybrid traveling mode is a mode in which a vehicle is driven by output from the engine 10 and output from at least one of the first motor generator 20 or the second motor generator 24.

The engine 10 is an internal combustion engine that generates a torque by using gasoline or the like as fuel. The engine 10 includes a crankshaft 11 as an output shaft. The crankshaft 11 is extended in an automatic transmission 30. In addition, the crankshaft 11 is coupled to a mechanical oil pump 15. The oil pump 15 may be coupled to an axle (not illustrated), and a primary shaft 34 or a secondary shaft 36 of the CVT 31 via a gear mechanism (not illustrated). In the case where the oil pump 15 is coupled to the axle, the oil pump 15 may also be driven by rotation of a driving wheel (wheel) 80. In the case where the oil pump 15 is coupled to the primary shaft 34 or the secondary shaft 36, the oil pump 15 may also be driven by rotation of the driving wheel 80 while a second transmission clutch 46 is engaged. The oil pump 15 is driven by a torque of the engine 10 or rotation of the driving wheel 80, and supplies a working fluid to the automatic transmission 30. The working fluid supplied to the automatic transmission 30 is used as a working fluid by which the CVT 31 and respective clutches are operated. The automatic transmission device 30 includes the first motor generator 20, the second motor generator 24, and the continuously variable transmission (CVT) 31 serving as an automatic transmission.

The engine 10 and the first motor generator 20 are disposed in series via the engine clutch 42. Specifically, the engine clutch 42 is disposed between the crankshaft 11 of the engine 10 and the motor shaft 21 of the first motor generator 21. The engine clutch 42 is engaged or disengaged between the crankshaft 11 and the motor shaft 21. In the case where the engine clutch 42 is engaged, it is possible to transmit power between the crankshaft 11 and the motor shaft 21.

For example, the first motor generator 20 is a three-phase AC motor, and is coupled to a high-voltage battery 50 via an inverter 70. The first motor generator 20 has a function as a driving motor that is driven (power running driving) by electric power of the high-voltage battery 50 and generates vehicle driving force, a function as a generator that is driven by a torque from the engine 10 and generates electric power, and a function as a generator that is driven in a regenerative manner when the vehicle speed slows down and that generates electric power by using kinetic energy of the driving wheel 80. In addition, the first motor generator 20 has a combination of a function as a starter motor that starts and stops the engine 10, and a function as a motor that rotates the oil pump 28 coupled to the motor shaft 21.

In the case where the first motor generator 20 functions as the starter motor, the driving motor, or the driving motor of the oil pump 28, the inverter 70 drives the first motor generator 20 by converting DC power supplied from the high-voltage battery 50 into AC power. In the case where the first motor generator 20 functions as the generator, the inverter 70 charges the high-voltage battery 50 by converting AC power generated in the first motor generator 20 into DC power.

As described above, in the driving control mechanism 1 according to the implementation, the engine clutch 42 transmits power between the crankshaft 11 and the motor shaft 21. In the case where the first motor generator 20 functions as the driving motor, the first motor generator 20 and the engine 10 are completely separated. Thereby, the engine 10 does not consume a torque from the first motor generator 20. This suppresses reduction in efficiency of the first motor generator 20. Instead of the engine clutch 42, a torque converter may transmit power between the crankshaft 11 and the motor shaft 21.

The gear oil pump 28 is coupled to the motor shaft 21 of the first motor generator 20. The oil pump 28 is rotated by rotation of the motor shaft 21, and supplies a working fluid to a CVT 31 and the respective clutches. Such an oil pump 28 is configured as an electric oil pump to be driven by the first motor generator 20. The motor shaft 21 of the first motor generator 20 is coupled to the primary shaft 34 of the CVT 31 via a first transmission clutch 44. The first transmission clutch 44 is engaged or disengaged between the motor shaft 21 and the primary shaft 34. In the case where the first transmission clutch 44 is engaged, it is possible to transmit power between the motor shaft 21 and the primary shaft 34.

The CVT 31 includes the primary shaft 34 and the secondary shaft 36 disposed parallel to the primary shaft 34. A primary pulley 33 is fixed to the primary shaft 34, and a secondary pulley 35 is fixed to the secondary shaft 36. The primary pulley 33 and the secondary pulley 35 are wound with a winding-type torque transmission member 37 made of a belt or a chain. The CVT 31 changes a pulley ratio by changing a winding radius of the torque transmission member 37 on the primary pulley 33 and the secondary pulley 35, and transmits driving force converted at any transmission gear ratio between the primary shaft 34 and the secondary shaft 33.

The secondary shaft 36 is provided in a coupled manner to a motor shaft 25 of the second motor generator 24 via the second transmission clutch 46. The second transmission clutch 46 is engaged or disengaged between the secondary shaft 36 and the motor shaft 25. In the case where the second transmission clutch 46 is engaged, it is possible to transmit power between the secondary shaft 36 and the motor shaft 25. The motor shaft 25 of the second motor generator 24 is provided in a coupled manner to the driving wheel 80 via a speed reduction gear and a driving shaft (that are not illustrated). A driving force output via the motor shaft 25 can be transmitted to the driving wheel 80. The motor shaft 25 may be coupled to a differential gear (not illustrated) so as to distribute the driving force to the front wheels and the rear wheels.

The second motor generator 24 is provided in a coupled manner to the engine 10 via the engine clutch 42, the first transmission clutch 44, and the second transmission clutch 46. In a way similar to the first motor generator 20, the second motor generator 24 is a three-phase AC motor, and is coupled to the high-voltage battery 50 via the inverter 70. The second motor generator 24 has a function as a driving motor that is driven (power running driving) by electric power of the high-voltage battery 50 and generates vehicle driving force, and a function as a generator that is driven in a regenerative manner when the vehicle speed slows down and that generates electric power by using kinetic energy of the driving wheel 80.

In the case where the second motor generator 24 functions as the driving motor, the inverter 70 drives the second motor generator 24 by converting DC power supplied from the high-voltage battery 50 into AC power. In the case where the second motor generator 24 functions as the generator, the inverter 70 charges the high-voltage battery 50 by converting AC power generated in the second motor generator 24 into DC power. Rated output of the second motor generator 24 and rated output of the first motor generator 20 may be the same or may be different from each other.

The high-voltage battery 50 is coupled to the first motor generator 20 and the second motor generator 24 via the inverter 70, and the high-voltage battery 50 is coupled to a low-voltage battery 60 via a DC/DC converter 55. For example, the high-voltage battery 50 is a battery capable of charge and discharge whose rated voltage is 200 V. For example, the low-voltage battery 60 is a battery capable of charge and discharge whose rated voltage is 12 V. The low-voltage battery 60 is used as a main power supply of a hybrid vehicle system. The DC/DC converter 55 steps down DC power voltage of the high-voltage battery 50 and supplies charging power to the low-voltage battery 60.

The engine 10 is controlled by an engine control unit (engine electronic control unit (ECU)) 200. The automatic transmission 30 is controlled by a transmission control unit (transmission ECU) 300. The first motor generator 20 and the second motor generator 24 are controlled by a motor control unit (motor ECU) 400. The engine ECU 200, the transmission ECU 300, and the motor ECU 400 are coupled to a hybrid control unit (hybrid ECU) 100 that serves as a driving control device and that integrally controls the entire system. The hybrid ECU 100 uses the engine ECU 200, the transmission ECU 300, and the motor ECU 400 to control traveling or speed reduction of the vehicle or to control charging of the high-voltage battery 50.

Each of the ECUs includes a microcontroller, various kinds of interface or peripheral equipment and the like. The respective ECUs are coupled via a communication line such as the Controller Area Network (CAN) to establish a two-way communication. The respective ECUs communicate control information or various kinds of information on control targets to each other. Next, overview of functions of the respective ECUs will be described.

The engine ECU 200 receives a control command from the hybrid ECU 100, and controls the engine 10 in a manner that output of the engine 10 becomes a control command value. Specifically, the engine ECU 200 calculates controlled variables such as a throttle angle, ignition timing, and fuel injection quantity, on the basis of information detected by various sensors of the engine 10. The engine ECU 200 drives actuators related to a throttle valve, an ignition plug, a fuel injection valve, and the like on the basis of the calculated controlled variables.

The motor ECU 400 receives a control command from the hybrid ECU 100, and independently controls the first motor generator 20 or the second motor generator 24 via the inverter 70 in a manner that output from the first motor generator 20 or the second motor generator 24 becomes a control command value. Specifically, the motor ECU 400 outputs a current command or a voltage command to the inverter 70 on the basis of information on a rotation speed, voltage, current, and the like of the first motor generator 20 or the second motor generator 24.

The transmission ECU 300 receives a control command from the hybrid ECU 100, decides a transmission gear ratio of the CVT 31, and performs control to acquire an appropriate transmission gear ratio according to a traveling state. For example, the transmission ECU 300 controls the transmission gear ratio of the CVT 31 by controlling oil pressure and adjusting a pulley ratio. The transmission ECU 300 receives a control command from the hybrid ECU 100, controls the engine clutch 42, the first transmission clutch 44, the second transmission clutch 46, and the like, and switches the traveling modes. For example, the transmission ECU 300 controls engagement and disengagement of the respective clutches by controlling the oil pressure.

In the case of the engine traveling mode, the transmission ECU 300 engages all the engine clutch 42, the first transmission clutch 44, and the second transmission clutch 46, and transmits a torque from the engine 10 to the CVT 31. Subsequently, the transmission ECU 300 causes the CVT 31 to convert a torque from the engine 10 at a predetermined transmission gear ratio, and causes the CVT 31 to transmit the torque to the driving wheel 80.

In the case of the single motor EV traveling mode, the transmission ECU 300 disengages all the engine clutch 42, the first transmission clutch 44, and the second transmission clutch 46, and transmits a driving force from the second motor generator 24 to the driving wheel 80. Alternatively, in the case of the single traveling mode, the transmission ECU 300 may engage the first transmission clutch 44 and the second transmission clutch 46, and transmit a torque from the first motor generator 20 to the driving wheel 80 via the CVT 31 and the motor shaft 25.

In the case of the twin motor EV traveling mode, the transmission ECU 300 engages the first transmission clutch 44 and the second transmission clutch 46, and transmits a torque from the first motor generator 20 to the CVT 31. Subsequently, the transmission ECU 300 transmits the torque from the first motor generator 20 to the motor shaft 25 via the CVT 31, and transmits the torque to the driving wheel 80 in addition to a driving force of the second motor generator 24.

In the case of the hybrid traveling mode, the transmission ECU 300 engages all the engine clutch 42, the first transmission clutch 44, and the second transmission clutch 46, and transmits a torque from the engine 10 to the CVT 31. Subsequently, the transmission ECU 300 causes the CVT 31 to convert the transmitted torque at a predetermined transmission gear ratio, and causes the CVT 31 to transmit the torque to the driving wheel via the motor shaft 25 in addition to a driving force of the second motor generator 24.

In addition, to start the engine 10, the transmission ECU 300 engages the engine clutch 42 and cranks the engine 10 by using the torque of the first motor generator 20. At this time, the transmission ECU 300 disengages the first transmission clutch 44 before engaging the engine clutch 42 so as not to cause front/rear vibration in a vehicle due to rotation difference between the engine 10 and the first motor generator 20.

In the driving control mechanism 1 according to the implementation, the second motor generator 24 is driven in a regenerative manner when the vehicle slows down in any traveling mode. Thereby, it is possible to generate a regenerative braking force. In addition, by driving the first motor generator 20 in a regenerative manner when the vehicle slows down in the engine traveling mode, the twin motor EV traveling mode, or the hybrid traveling mode, it is possible to generate a regenerative braking force. In addition, in the single motor EV traveling mode or the hybrid traveling mode, the first motor generator 20 can generate electric power by using a part or all of a torque from the engine 10. In addition, in the engine traveling mode, the first motor generator 20 can generate electric power by using a part of a torque from the engine 10.

In the driving control mechanism 1 according to the implementation, the first motor generator 20 also has the function as the starter motor of the engine 10. Therefore, it is possible to omit the conventional starter motor that is used only when the engine 10 starts or stops. In addition, the first motor generator 20 integrated with the oil pump 28 has a function as the electric oil pump. Therefore, it is possible to omit the conventional electric oil pump that is used only when the engine 10 or the driving wheel 80 stops and the gear oil pump 15 cannot generate oil pressure of a working fluid.

In the driving control mechanism 1 according to the implementation, the first motor generator 20 is provided in a coupled manner to the primary pulley 33 of the CVT 31 via the first transmission clutch 44. This enables the first motor generator 20 to function as the driving motor during traveling. Therefore, it is possible to improve engine performance of the vehicle. In addition, the first motor generator 20 can function as a generator in the case where the output from the engine 10 includes a surplus torque while the engine 10 is generating driving force of the vehicle. Therefore, it is possible to improve fuel economy performance of the vehicle.

<1-2. Configuration of Driving Control Mechanism>

Figure 2:
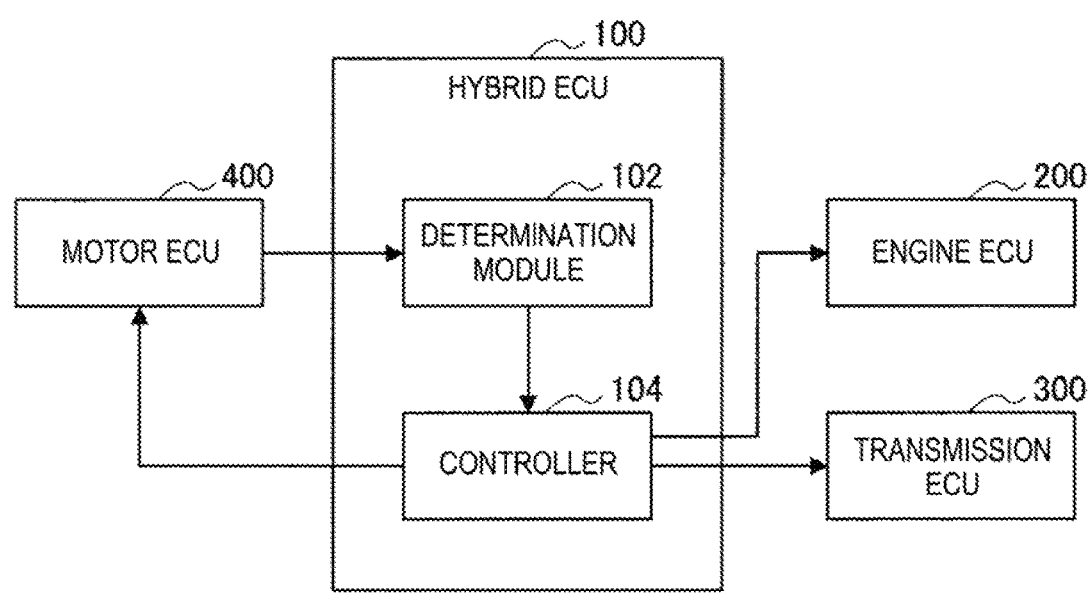
FIG. 2 is a block diagram schematically illustrating an example of a functional configuration of a hybrid ECU according to an implementation of the present invention.

Next, with reference to FIG. 2, a functional configuration of the driving control device 100 (hybrid ECU 100) will be described. FIG. 2 is a block diagram schematically illustrating an example of the functional configuration of the hybrid ECU 100 according to the implementation of the present invention. Here, only a function of the hybrid ECU 100 related to a process according to the implementation of the present invention will be described.

As illustrated in FIG. 2, the hybrid ECU 100 includes a determination module 102 and a controller 104.

(Determination Module)

The determination module 102 determines presence or absence of switching (transition request) of modes. Specifically, the determination module 102 determines whether to switch the mode from the EV mode to the HEV mode. For example, the determination module 102 determines to switch the mode from the EV mode to the HEV mode when the engine start request is issued. For example, the engine start request is issued in the case where a state of charge (SOC) (that is, charging rate or remaining electric power capacity) of the high-voltage battery 50 is a threshold or less in the EV mode, or in the case where a requested driving force increases due to additional depression of the accelerator pedal or the like.

In addition, the determination module 102 determines whether to change the transmission gear ratio. Specifically, the determination module 102 determines whether to change the transmission gear ratio on the basis of availability of increase in a driving force of the second motor generator 24. More specifically, the determination module 102 determines to reduce the transmission gear ratio in the case where output from the second motor generator 24 is an upper limited or less after the driving force is increased. For example, the determination module 102 determines to enable a mode in which the transmission gear ratio is lower than a target transmission gear ratio according to a requested driving force (hereinafter, also referred to as shift Hi mode) in the case where output from the second motor generator 24 due to increase in a driving force of the second motor generator 24 according to reduction in the transmission gear ratio (to be described later) is a preset value or a calculated value or less. The preset value may be an upper limit of output set as a specification of the second motor generator 24. The calculated value may be a value calculated on the basis of temperature of the second motor generator 24, electric power of the high-voltage battery 50 that can be used for the second motor generator 24, or the like. Especially, the calculated value is used for the electric power that can be used for the second motor generator 24 since the electric power varies in accordance with electric power supply requests from other devices such as an air conditioner equipped in a vehicle. Thereby, it is possible to prevent a shortage of a driving force due to reduction in the transmission gear ratio in the case where the driving force does not seem to increase in accordance with reduction in the transmission gear ratio due to a shortage of output from the second motor generator 24.

More specifically, the determination module 102 determines to reduce the transmission gear ratio in the case where a value related to an electric power stored in a battery to be used for driving the second motor generator 24 is a threshold or more. For example, the determination module 102 determines to reduce the transmission gear ratio in the case where the remaining electric power capacity or the charging rate such as the SOC of the high-voltage battery 50 is a threshold or more. Thereby, it is possible to secure electric power in the high-voltage battery 50 even after the driving force of the second motor generator 24 increases in accordance with the reduction in the transmission gear ratio.

It may be determined whether to change the transmission gear ratio on the basis of whether the second motor generator 24 malfunctions. For example, the determination module 102 determines to enable the shift Hi mode in the case where the second motor generator 24 and the motor ECU 400 do not malfunction.

(Controller)

The controller 104 determines a transmission gear ratio control manner on the basis of a determination result of the determination module 102. Specifically, when the determination module 102 determines to reduce the transmission gear ratio, the controller 104 causes the CVT 31 to reduce the transmission gear ratio to a value less than a target transmission gear ratio according to a requested driving force. More specifically, the controller 104 causes the CVT 31 to reduce the transmission gear ratio to a value slightly above a transmission gear ratio at which a rotation speed of the input shaft (that is, primary shaft 34) of the CVT 31 becomes a rotation speed at which the engine 10 stops (hereinafter, also referred to as an engine minimum revolution speed). For example, when the shift Hi mode is enabled in the case where the first transmission clutch 44 and the second transmission clutch 46 are engaged, the controller 104 calculates a transmission gear ratio (hereinafter, also referred to as a specific transmission gear ratio) at which the engine revolution speed does not reach the engine minimum revolution speed when engaging the engine clutch 42. Subsequently, the controller 104 outputs a command to change the transmission gear ratio into the calculated specific transmission gear ratio (hereinafter, also referred to as specific transmission gear ratio transition command) to the transmission ECU 300. The transmission ECU 300 receives the specific transmission gear ratio transition command, and causes the CVT 31 to start reducing the transmission gear ratio to the specific transmission gear ratio.

The controller 104 causes the CVT 31 to reduce the transmission gear ratio before a torque from the engine 10 is transmitted to the driving wheel 80 (that is, CVT 31). Specifically, the controller 104 outputs the specific transmission gear ratio transition command to the transmission ECU 300 before the engine clutch 42 is engaged. For example, the controller 104 outputs the specific transmission gear ratio transition command before outputting an engine clutch 42 engaging command. Thereby, the transmission gear ratio of the CVT 31 has already been reduced when transmitting the torque from the engine 10. Accordingly, it is possible to surely suppress shocks that may be caused when engaging the engine clutch 42.

In addition, after transition to the HEV mode, the controller 104 causes the CVT 31 to change the transmission gear ratio back to the target transmission gear ratio. Specifically, after the engine clutch 42 is engaged, the controller 104 outputs a command (hereinafter, also referred to as target transmission gear ratio transition command) to the transmission ECU 300. By the command, the transmission gear ratio is changed back to the target transmission gear ratio more gently than change for reducing the transmission gear ratio to a specific transmission gear ratio. For example, the controller 104 outputs the target transmission gear ratio transition command that increases the transmission gear ratio toward the target transmission gear ratio at a speed slower than the reduction speed of the transmission gear ratio to the specific transmission gear ratio. This can overcome a shortage of a driving force due to reduction in the transmission gear ratio. In addition, by reducing a degree of change in the transmission gear ratio per unit time, it is possible to suppress occurrence of shocks due to the change in the transmission gear ratio. The controller 104 may output a specific transmission gear ratio transition command including a command corresponding to the target transmission gear ratio transition command, to the transmission ECU 300. In this case, the transmission ECU 300 causes the CVT 31 to change the transmission gear ratio back to the target transmission gear ratio after the engine clutch 42 is engaged.

Next, a control manner of the second motor generator 24 will be described. The controller 104 determines the control manner of the second motor generator 24 on the basis of a determination result of the determination module 102. Specifically, when the determination module 102 determines to reduce the transmission gear ratio, the controller 104 causes the second motor generator 24 to increase a driving force. More specifically, the controller 104 causes the second motor generator 24 to increase a driving force by a value more than or equal to a difference between a requested driving force and a driving force after reducing a transmission gear ratio. For example, when the shift Hi mode is enabled, the controller 104 calculates the difference between the requested driving force and the driving force at a specific transmission gear ratio. Next, the controller 104 outputs a command (hereinafter, also referred to as driving force difference increase command) to the motor ECU 400. By this command, the second motor generator 24 increases a driving force by a driving force corresponding to the calculated difference between the driving forces (hereinafter, also referred to as driving force difference). This can compensate for a shortage of the driving force due to reduction in the transmission gear ratio.

In addition, after transition to the HEV mode, the controller 104 causes the second motor generator 24 to change the driving force back to the driving force before the increase. For example, after the engine clutch 42 is engaged, the controller 104 outputs a command to reduce the increased driving force (hereinafter, also referred to as driving force difference reduction command) to the motor ECU 400. This can reduce electric power to be consumed to drive the second motor generator 24, to an appropriate amount.

In addition, the controller 104 changes the driving force of the second motor generator 24 in accordance with change in the transmission gear ratio. Specifically, the controller 104 increases a driving force of the second motor generator 24 in accordance with reduction in the transmission gear ratio to a specific transmission gear ratio, and the controller 104 reduces the driving force of the second motor generator 24 in accordance with increase in the transmission gear ratio to a target transmission gear ratio. For example, the controller 104 outputs the specific transmission gear ratio transition command to the transmission ECU 300 and outputs the driving force difference increase command at the same timing. This can compensate for the driving force in accordance with change in the driving force due to change in the transmission gear ratio.

<1-3. Process in Driving Control Device>

Next, a process in the driving control device 100 (that is, hybrid ECU 100) according to the implementation of the present invention will be described.

(Entire Process)

With reference to FIG. 3, an entire process of the hybrid ECU 100 will be described. FIG. 3 is a flow chart schematically illustrating an example of the entire process of the hybrid ECU 100 according to the implementation of the present invention.

The hybrid ECU 100 determines whether the engine start request has been issued (Step S502). Specifically, the determination module 102 determines whether a transition request from the EV mode to the HEV mode, that is, the engine start request based on battery information obtained from the motor ECU 400 or the like has been issued.

When it is determined that the engine start request has been issued, the hybrid ECU 100 determines whether to enable the shift Hi mode (Step S504). Specifically, the determination module 102 determines whether to enable the shift Hi mode on the basis of availability of increase in a driving force of the second motor generator 24. Its details will be described later.

When it is determined to enable the shift Hi mode, the hybrid ECU 100 sets the shift Hi mode to an ON state (Step S506). Specifically, when it is determined to enable the shift Hi mode, the determination module 102 sets a flag to an ON state. The flag indicates a status of the shift Hi mode.

Next, the hybrid ECU 100 causes the CVT 31 to change the transmission gear ratio to a transmission gear ratio lower than a target transmission gear ratio (Step S508). Specifically, the controller 104 outputs a specific transmission gear ratio transition command to the transmission ECU 300 when the flag related to the shift Hi mode is turned on.

Next, the hybrid ECU 100 causes the second motor generator 24 to increase a driving force (Step S510). Specifically, the controller 104 outputs a driving force difference increase command to the motor ECU 400 when the flag related to the shift Hi mode is turned on.

Next, the hybrid ECU 100 determines whether an engine start process has been completed (Step S512). Specifically, the controller 104 determines whether transition to the HEV mode has been completed. In other words, the controller 104 determines whether the engine clutch 42 has been engaged and a torque of the engine 10 is ready to be transmitted to the driving wheel 80 via the CVT 31.

When it is determined that the engine start process has been completed, the hybrid ECU 100 causes the CVT 31 to change the transmission gear ratio back to the target transmission gear ratio (Step S514). Specifically, the controller 104 outputs a target transmission gear ratio transition command to the transmission ECU 300 when it is determined that the transition to the HEV mode has been completed.

In addition, the hybrid ECU 100 causes the second motor generator 24 to change the driving force back to the driving force before the increase (Step S516). Specifically, the controller 104 outputs the driving force difference reduction command to the motor ECU 400 when it is determined that the transition to the HEV mode has been completed.

Next, the hybrid ECU 100 turns off the shift Hi mode (Step S518). Specifically, the controller 104 sets the flag related to the shift Hi mode to an OFF state.

(Shift Hi Mode Enablement Determination Process)

Next, with reference to FIG. 4, details of the process in Step S504 will be described. FIG. 4 is a flow chart schematically illustrating the shift Hi mode enablement determination process of the hybrid ECU 100 according to the implementation of the present invention.

The hybrid ECU 100 determines whether an SOC of a battery for driving the second motor generator 24 is a threshold or more (Step S602). Specifically, the controller 104 determines whether an SOC of the high-voltage battery 50 is the threshold or more.

When it is determined that the SOC of the battery for driving the second motor generator 24 is the threshold or more, the hybrid ECU 100 determines whether output from the second motor generator 24 after increasing the driving force is an upper limit or less (Step S604). Specifically, the controller 104 determines whether the output of the second motor generator 24 after increasing the driving force is less than or equal to an upper limit of the output based on its specification.

When it is determined that the output from the second motor generator 24 after increasing the driving force is less than or equal to the upper limit, the shift Hi mode is determined to be enabled, and the process proceeds to the above described Step S506. If not, the shift Hi mode is determined not to be enabled, and the process ends.

Only one of the Step S602 and the S604 may be performed, or another determination process may be added.

<2. Operation Example>

The driving control mechanism 1 according to the implementation of the present invention has been described. Next, with reference to FIG. 5, an operation example of the driving control mechanism 1 will be described. FIG. 5 is a timing chart illustrating the operation example of the driving control mechanism 1 according to the implementation of the present invention. In FIG. 5, solid lines represent operation of the driving control mechanism 1, and dashed lines represent operation of a conventional driving control mechanism.

In the EV mode, the driving control mechanism 1 controls the CVT 31 and the second motor generator 24 in accordance with a requested driving force. For example, in the EV mode, the hybrid ECU 100 drives the second motor generator 24 by a predetermined driving force via the motor ECU 400, and causes the CVT 31 to change the transmission gear ratio to a target transmission gear ratio according a requested driving force via the transmission ECU 300.

When the transition request from the EV mode to the HEV mode is issued (time t1), the driving control mechanism 1 causes the CVT 31 to reduce the transmission gear ratio to a specific transmission gear ratio (time t1 to t2). For example, when the engine start request is issued in the EV mode, the hybrid ECU 100 causes the CVT 31 to reduce the transmission gear ratio to the specific transmission gear ratio via the transmission ECU 300. The transmission gear ratio may be changed to the specific transmission gear ratio as quick as possible in a range in which a degree of shocks caused by the change in the transmission gear ratio is a predetermined degree or less. Thereby, it is possible to prevent lower responsibility of the driving force due to prolongation of the change in the transmission gear ratio.

In addition, the driving control mechanism 1 causes the second motor generator 24 to increase the driving force by a driving force difference (time t1 to t2). For example, when the engine start request is issued in the EV mode, the hybrid ECU 100 causes the second motor generator 24 to increase the driving force via the motor ECU 400 by a calculated driving force difference. The driving force of the second motor generator 24 correlatively increases in accordance with reduction in the transmission gear ratio of the CVT 31, for example.

Next, the driving control mechanism 1 starts the engine 10 and starts transmission of a torque from the engine 10 to the driving wheel 80. For example, after controlling the transmission gear ratio and the driving force of the second motor generator 24, the hybrid ECU 100 starts the engine 10 via the engine ECU 200, and starts to engage the engine clutch 42.

In the prior art, the transmission gear ratio remains in the target transmission gear ratio, and thereby shocks may be caused when engaging the engine clutch 42. For example, as indicated by the dashed line in FIG. 5, longitudinal acceleration precipitously varies when engagement of the engine clutch 42 starts at the time t2. This means that the shock has been caused by the engagement of the engine clutch 42.

On the other hand, in the case of the driving control mechanism 1, the change in longitudinal acceleration is suppressed in comparison with the conventional driving control mechanism as indicated by the solid line in FIG. 5, and the longitudinal acceleration scarcely varies even when the engagement of the engine clutch 42 starts at the time t2. This means that shocks due to the engagement of the engine clutch are suppressed.

In addition, when a driving force increase request is issued by further depressing an accelerator pedal for example, (time t3), the driving control mechanism 1 increases the driving force of the second motor generator 24 (time t3 to t4). For example, when an accelerator opening degree increases as illustrated in FIG. 5, the requested driving force increases. Therefore, the hybrid ECU 100 calculates a difference between the increased requested driving force and the outputting driving force, and causes the second motor generator 24 to increase the driving force via the motor ECU 400 by a driving force corresponding to the calculated difference between the driving forces. As a result, the longitudinal acceleration increases in accordance with the change in the accelerator opening degree.

When the transition to the HEV mode is completed (time t4), the driving control mechanism 1 causes the CVT 31 to increase the transmission gear ratio to a target transmission gear ratio (time t4 to t5). For example, when the engagement of the engine clutch 42 is completed, the hybrid ECU 100 causes the CVT 31 to increase the transmission gear ratio to the target transmission gear ratio via the transmission ECU 300. The increase speed of the transmission gear ratio to the target transmission gear ratio is slower than reduction speed of the transmission gear ratio to the specific transmission gear ratio. This can suppress shocks due to the change in the transmission gear ratio.

In addition, the driving control mechanism 1 causes the second motor generator 24 to reduce the driving force by a driving force difference (time t4 to t5). For example, when engagement of the engine clutch 42 is completed, the hybrid ECU 100 causes the second motor generator 24 to reduce the driving force via the motor ECU 400 by the driving force difference by which the second motor generator 24 has increased the driving force. The driving force of the second motor generator 24 is correlatively reduced in accordance with increase in the transmission gear ratio of the CVT 31, for example.

<3. Summary of Implementation of Present Invention>

As described above, according to the implementation of the present disclosure, the driving control mechanism 1 includes the second motor generator 24 coupled to the driving wheel 80, the CVT 31 coupled to the driving wheel 80, and the engine 10 coupled to the primary shaft 34 of the CVT 31. The CVT 31 reduces a transmission gear ratio to a value less than a target transmission gear ratio according to a requested driving force when a driving force of the second motor generator 24 is transmitted to the driving wheel 80, and a transition request to the HEV mode is issued in the EV mode. In the EV mode, a torque from the engine 10 is not transmitted to the driving wheel 80. In the HEV mode, torques from the second motor generator 24 and the engine 10 are transmitted to the driving wheel 80. In addition, when the transition request is issued, the second motor generator 24 increases the driving force to be transmitted to the driving wheel 80. In addition, the driving control device (hybrid ECU) 100 that achieves the operation of the driving control mechanism 1 is also provided.

In the prior arts, at least one of an engine revolution speed or a transmission gear ratio of a CVT is controlled in a manner that a secondary rotation speed (rotation speed of secondary shaft) exceeds a rotation speed of an output shaft (driving wheel) when switching the EV mode to the HEV mode. However, when reducing the transmission gear ratio, the driving force to be transmitted to the driving wheel is reduced. In addition, when the engine revolution speed increases, fuel economy may become poor or hazardous material included in exhaust gas may be increased.

On the other hand, the driving control mechanism 1 can compensate for reduction in the driving force by increasing the driving force of the second motor generator 24 when the transmission gear ratio is reduced. Thereby, it is possible to reduce the transmission gear ratio without a shortage of the driving force, and it is possible to suppress occurrence of shocks and a degree of the shocks when transmitting a torque from the engine 10. Accordingly, it is possible to achieve both maintenance of the driving force and suppression of shocks due to power transmission when switching the EV mode to the HEV mode.

When the transition request is issued, the CVT 31 reduces the transmission gear ratio to a value slightly above a transmission gear ratio at which a rotation speed of the primary shaft 34 becomes a rotation speed at which the engine 10 stops. When engagement of the engine clutch 42 starts, the engine revolution speed is reduced so that the engine revolution speed matches the rotation speed of the primary shaft 34. In the case where the rotation speed of the primary shaft 34 is reduced too much due to reduction in the transmission gear ratio, the engine revolution speed may be reduced to a minimum engine revolution speed or less when engaging the engine clutch 42. This may result in shocks or engine stall in the engine 10. However, by setting the specific transmission gear ratio to a value slightly above a transmission gear ratio at which the rotation speed of the primary shaft 34 becomes the minimum engine revolution speed, it is possible to suppress shocks or engine stall when engaging the engine clutch 42.

When the transition request is issued, the CVT 31 reduces a transmission gear ratio to a value less than the target transmission gear ratio before a torque from the engine 10 is transmitted to the driving wheel 80. Thereby, the reduced transmission gear ratio of the CVT 31 can be prepared before transmitting the torque from the engine 10. Therefore, it is possible to more surely suppress shocks that may occur when engaging the engine clutch 42.

In addition, the CVT 31 reduces the transmission gear ratio to a value less than the target transmission gear ratio in the case where the second motor generator 24 increases the driving force. When the transmission gear ratio is reduced also in the case where the second motor generator 24 cannot increase the driving force, the shortage of the driving force may occur. However, it is possible to prevent reduction in vehicle speed due to the shortage of the driving force by reducing the transmission gear ratio in the case where the second motor generator 24 can increase the driving force.

In addition, the second motor generator 24 increases the driving force in the case where output from the second motor generator 24 after increasing the driving force is an upper limit or less. Thereby, it is possible to prevent reduction in the transmission gear ratio in the case where the driving force does not seem to increase in accordance with reduction in the transmission gear ratio due to the shortage of the output from the second motor generator 24. This can prevent the shortage of the driving force. In addition, it is possible to avoid too much load on the second motor generator 24.

The second motor generator 24 increases the driving force in the case where a value related to an electric power stored in the battery to be used for driving the second motor generator 24 is a threshold or more. Thereby, it is possible to secure the electric power in the high-voltage battery 50 even after the driving force of the second motor generator 24 is increased in accordance with the reduction in the transmission gear ratio. Since the high-voltage battery 50 also supplies the electric power to other devices in the vehicle, it is also possible to suppress running out of the high-voltage battery 50. Accordingly, it is possible to keep traveling of the vehicle.

In addition, the second motor generator 24 increases the driving force by a value more than or equal to a difference between a requested driving force and the driving force after reducing the transmission gear ratio. This can compensate for an entire shortage of the driving force due to reduction in the transmission gear ratio. Therefore, it is possible to prevent a driver of the vehicle from feeling a shortage of the driving force, and it is possible to keep drivability and responsibility of the vehicle.

In addition, the second motor generator 24 changes the driving force in accordance with change in the transmission gear ratio. In the case where there is a gap between change in the transmission gear ratio of the CVT 31 and change in the driving force of the second motor generator 24, a shortage or excess of the driving force may occur. In addition, the driver of the vehicle probably feels strange about both the shortage and excess of the driving force. However, it is possible to suppress the driver's feeling of strangeness by matching the change in the transmission gear ratio with the change in the driving force.

After transition to the HEV mode, the CVT 31 changes the transmission gear ratio back to the target transmission gear ratio. Since the transition to the HEV mode is completed, the shock due to transmission of the torque of the engine 10 does not occur. Accordingly, the transmission gear ratio increases, and it is possible to increase the driving force to be transmitted to the driving wheel 80 via the CVT 31. In addition, this can reduce the driving force of the second motor generator 24, in other words, this can reduce output from the second motor generator 24. Accordingly, it is possible to reduce an amount of electric power used by the high-voltage battery 50.

The CVT 31 changes the transmission gear ratio back to the target transmission gear ratio more gently than change for reducing a transmission gear ratio. Thereby, it is possible to increase the transmission gear ratio in a manner that a degree of change in the transmission gear ratio per unit time becomes smaller than a degree of reduction of the transmission gear ratio to the specific transmission gear ratio. Accordingly, it is possible to suppress shocks due to change in the transmission gear ratio.

<4. Modification>

The implementation of the present invention has been described above. The implementation of the present invention is not limited to the above described example. Modifications of the implementation of the present invention will be described below.

According to a modification of the implementation of the present invention, the driving control mechanism 1 may change at least one of the transmission gear ratio of the CVT 31 or the driving force of the second motor generator 24 back to the transmission gear ratio before the reduction or the driving force before the increase in the case where the requested driving force is reduced. Specifically, when the requested driving force is reduced, the driving control mechanism 1 increases the transmission gear ratio of the CVT 31 to a value more than the specific transmission gear ratio. For example, the hybrid ECU 100 calculates a change-back amount of the transmission gear ratio according to the reduction in the requested driving force due to reduction in a pedaling force of an accelerator pedal. Subsequently, the hybrid ECU 100 outputs a command to the transmission ECU 300. By this command, the transmission gear ratio is increased from the specific transmission gear ratio by the calculated change-back amount of the transmission gear ratio.

Specifically, when the requested driving force is reduced, the driving control mechanism 1 reduces the driving force of the second motor generator 24 to a value less than the driving force that has been increased by the driving force difference. For example, the hybrid ECU 100 calculates a change-back amount of the driving force of the second motor generator 24 according to the reduction in the requested driving force due to reduction in a pedaling force of the accelerator pedal. Subsequently, the hybrid ECU 100 outputs a command to the motor ECU 400. By this command, the driving force is reduced by the calculated change-back amount of the driving force.

As described above, according to the modification of the implementation of the present invention, the driving control mechanism 1 may change at least one of the transmission gear ratio of the CVT 31 or the driving force of the second motor generator 24 back to the transmission gear ratio before the reduction or the driving force before the increase in the case where the requested driving force is reduced. Basically, it is assumed that the requested driving force is increased in a state where the shift Hi mode is ON. However, even in such a state, sometimes the requested driving force is reduced as described above. In this case, as described in the above described modification, it is possible to handle the reduction in the requested driving force and additional control of the driving force does not have to be performed by adjusting the driving force of the second motor generator 24 or the transmission gear ratio controlled in the shift Hi mode. This can suppress complication of the driving force control. In addition, this can increase reduction following performance of the requested driving force. Therefore, the driver can feel speed reduction due to the reduction in the requested driving force with high responsibility. The change in the driving force of the second motor generator 24 is advantageous in view of fuel economy and responsibility in comparison with change in the transmission gear ratio of the CVT 31.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, the transmission is the continuously variable transmission (CVT) in the above described implementation. However, the present invention is not limited thereto. For example, the transmission may be automatic transmission (AT).

In addition, according to the above described implementation, the example in which a torque of the engine 10 is transmitted as a driving force to the driving wheel 80 by engaging the engine clutch 42 in the state in which the first transmission clutch 44 and the second transmission clutch 46 are engaged has been described. However, it is also possible that the torque of the engine 10 is transmitted as a driving force to the driving wheel 80 by engaging the second transmission clutch 46 in the state in which the engine clutch 42 and the first transmission clutch 44 are engaged. Alternatively, it is also possible that the torque of the engine 10 is transmitted as a driving force to the driving wheel 80 by engaging the first transmission clutch 44 in the state in which the engine clutch 42 and the second transmission clutch 46 are engaged.

In addition, according to the implementation, the example in which the transmission gear ratio of the CVT 31 and the driving force of the second motor generator 24 are respectively changed back to the transmission gear ratio before the reduction and the driving force before the increase after the transition to the HEV mode is completed has been described. However, such a change in the transmission gear ratio of the CVT 31 and the driving force of the second motor generator 24 may start during the transition to the HEV mode. For example, when rotation difference between an engine revolution speed and a rotation speed of the primary shaft 34 becomes a predetermined value or lower, the transmission gear ratio of the CVT 31 and the driving force of the second motor generator 24 may start to be changed back to the transmission gear ratio before the reduction and the driving force before the increase, respectively. In general, the sock due to the driving force transmission is likely to occur at a time of staring the transmission. When the transmission becomes stable, the shock relatively becomes less likely to occur. For example, the shock is less likely to occur even when the transmission gear ratio stats to be changed back to the transmission gear ratio before the reduction in a state where engagement of the engine clutch 42 is not completed after the engagement of the engine clutch 42 is started. On the other hand, it is possible to narrow a gap between the generated driving force and the requested driving force by changing the transmission gear ratio back to the transmission gear ratio before the reduction during engagement of the engine clutch 42, that is, during transition to the HEV mode. This can reduce the driving force to be increased by the second motor generator 24, and it is possible to reduce electric power to be consumed by the high-voltage battery 50.

The steps listed in the flow charts in the above described implementation includes not only the processes that are performed chronologically in the order they are listed, but also the processes that do not have to be performed chronologically but may be performed in parallel or individually. It is understood that even steps to be processed chronologically can be performed in a different order in some cases as necessary.

In addition, it is also possible to create a computer program for causing a hardware embedded in the driving control device (hybrid ECU) 100, to execute functions equivalent to the functional configurations of the driving control device 100. Moreover, it may be possible to provide a storage medium having the computer program stored therein.

The invention claimed is:

1. A driving control mechanism comprising:
 a first motor that is coupled to an internal combustion engine, and starts the internal combustion engine;
 a second motor that is coupled to a driving wheel; and
 a transmission that is coupled to the driving wheel and an output shaft of the internal combustion engine,
 wherein, in a first state in which a driving force of at least one of the first motor and the second motor is transmitted to the driving wheel and a driving force of the internal combustion engine is not transmitted to the driving wheel, the transmission reduces a transmission gear ratio to a value less than a target transmission gear ratio according to a requested driving force when a transition request to a second state in which the driving force of at least one of the first motor and the second motor and the driving force of the internal combustion engine are transmitted to the driving wheel is issued, and
 wherein the second motor increases a driving force to be transmitted to the driving wheel when the transition request is issued.

2. The driving control mechanism according to claim 1, wherein, when the transition request is issued, the transmission reduces the transmission gear ratio to a value slightly above a transmission gear ratio at which a rotation speed of an input shaft of the transmission becomes a rotation speed at which the internal combustion engine stops.

3. The driving control mechanism according to claim 1, wherein, when the transition request is issued, the transmission reduces the transmission gear ratio to a value less than the target transmission gear ratio before the driving force of the internal combustion engine is transmitted to the driving wheel.

4. The driving control mechanism according to claim 1, wherein the transmission reduces the transmission gear ratio to the value less than the target transmission gear ratio in a case where the second motor increases a driving force.

5. The driving control mechanism according to claim 4, wherein the second motor increases a driving force in a case where an output of the second motor after increasing the driving force is an upper limit or less.

6. The driving control mechanism according to claim 4, wherein the second motor increases a driving force in a case where a value related to an electric power stored in a battery to be used for driving the second motor is a threshold or more.

7. The driving control mechanism according to claim 1, wherein the second motor increases a driving force by a value more than or equal to a difference between the requested driving force and a driving force after reducing the transmission gear ratio.

8. The driving control mechanism according to claim 1, wherein the second motor changes a driving force in accordance with a change in the transmission gear ratio.

9. The driving control mechanism according to claim 1, wherein the transmission changes the transmission gear ratio back to the target transmission gear ratio after transitioning to the second state.

10. The driving control mechanism according to claim 9, wherein the transmission changes the transmission gear ratio back to the target transmission gear ratio more gently than a change for reducing the transmission gear ratio.

11. The driving control mechanism according to claim 1, wherein the second motor is coupled to an output shaft of the transmission.

12. A driving control device comprising:
 a determination module that determines presence or absence of a transition request to a second state in which driving force of a motor and a driving force of an internal combustion engine are transmitted to a driving wheel, in a first state in which the driving force of the motor is transmitted to the driving wheel and the driving force of the internal combustion engine is not transmitted to the driving wheel; and a controller that outputs a command to reduce a transmission gear ratio of a transmission to a value less than a target transmission gear ratio according to a requested driving force, and outputs a command to increase a driving force to be transmitted from the motor to the driving wheel, when the determination module determines that the transition request has been issued.

13. A driving control device comprising
circuitry configured to
  determine presence or absence of a transition request to a second state in which driving force of a motor and a driving force of an internal combustion engine are transmitted to a driving wheel, in a first state in which the driving force of the motor is transmitted to the driving wheel and the driving force of the internal combustion engine is not transmitted to the driving wheel; and
  output a command to reduce a transmission gear ratio of a transmission to a value less than a target transmission gear ratio according to a requested driving force, and output a command to increase a driving force to be transmitted from the motor to the driving wheel, when it is determined that the transition request has been issued.

* * * * *